United States Patent [19]

Rau

[11] 3,944,910

[45] Mar. 16, 1976

[54] METHOD AND APPARATUS UTILIZING MICROWAVE ELECTROMAGNETIC ENERGY FOR INVESTIGATING EARTH FORMATIONS

[75] Inventor: Rama N. Rau, Danbury, Conn.

[73] Assignee: Schlumberger Technology Corporation, New York, N.Y.

[22] Filed: Aug. 23, 1973

[21] Appl. No.: 390,987

[52] U.S. Cl. .................................................. 324/6
[51] Int. Cl.² ....................... G01V 3/12; G01V 3/18
[58] Field of Search ............................ 324/1, 6–8, 324/13

[56] References Cited
UNITED STATES PATENTS

| | | | |
|---|---|---|---|
| 2,139,460 | 12/1938 | Potapenko | 324/6 X |
| 2,455,941 | 12/1948 | Muskat et al. | 324/6 |
| 2,963,641 | 12/1960 | Nanz | 324/13 |
| 2,992,325 | 7/1961 | Lehan | 324/6 X |
| 3,391,334 | 7/1968 | Ruehle | 324/8 |
| 3,398,356 | 8/1968 | Still | 324/6 |
| 3,427,533 | 2/1969 | Gabillard | 324/6 |
| 3,551,797 | 12/1970 | Gouilloud et al. | 324/6 |

OTHER PUBLICATIONS
Daev, D. S. *Physical Principles of Electromagnetic Wavelogging,* Izv. Vyssh. Ucheb. Zaved., Geol. Razved. 13, No. 4, pp. 123–133 (1970).

*Primary Examiner*—Gerard R. Strecker
*Attorney, Agent, or Firm*—Martin Novack

[57] ABSTRACT

A method and apparatus for investigating earth formations surrounding a borehole by injecting microwave electromagnetic energy into the formations and then taking measurements which relate to the propagation of such energy in the formations. In the preferred form of the invention, the injected microwave energy establishes a lateral wave which travels in the formations adjacent the interface between the mudcake and the formations. Energy signals from the lateral wave are received at first and second receiving locations. The phase difference between signals received at the first and second receiving locations is measured. Also measured is the relative attenuation as between signals received at the two receiving locations. The loss-corrected dielectric constant associated with the formations surrounding the area between the first and second receiving locations is then obtained by judiciously combining the phase and attenuation measurements.

23 Claims, 9 Drawing Figures

METHOD AND APPARATUS UTILIZING MICROWAVE ELECTROMAGNETIC ENERGY FOR INVESTIGATING EARTH FORMATIONS

BACKGROUND OF THE INVENTION

This invention relates to the investigation of earth formations with electromagnetic energy and, more particularly to a method and apparatus for determinig the dielectric properties of subsurface formations by passing electromagnetic energy therethrough. The subject matter of this application is related to subject matter in a copending U.S. Application Ser. No. 390,988 of Levy et al entitled METHOD AND APPARATUS FOR INVESTIGATING EARTH FORMATIONS, filed of even date herewith and assigned to the same assignee as the present invention.

There have been previously proposed various techniques for measuring the dielectric constant or electric permittivity of subsurface formations. Prior investigators have recognized that the dielectric constant of the different materials of earth formations vary widely (e.g. 2.2 for oil, 7.5 for limestone and 80 for water) and that the measurement of dielectric properties therefore holds promise of being a useful means of formation evaluation. As an illustration, if the lithology and degree of water saturation of a particular formation are determined from conventional well logging techniques, it is recognized that porosity should be determinable if the dielectfic constant of the material could be obtained. Similarly, if the lithology and porosity were given as "knowns," information as to the degree of water saturation should be obtainable by measuring the dielectric constant of the formation.

Previously proposed instruments for the logging of dielectric constants in a borehole have not achieved hoped-for success for a variety of reasons. To understand the difficulties which have been encountered by investigators it is helpful to examine momentarily the general nature of the dielectric constant of a lossy material which can be expressed as a complex quantity of the form $$\epsilon^* = \epsilon' + j\epsilon''$$

The real part $\epsilon'$ in this equation represents the "true" dielectric constant of the material in lossless form; i.e., the measure of displacement currents for a particular electric field in the material if it were lossless. The imaginary part $\epsilon''$ represents the "loss factor" of the material; i.e., the losses due to conduction and relaxation effects. Most previous efforts have been concerned with determining the value of $\epsilon'$ for a particular portion of subsurface formation. However, subsurface formation materials have appreciable conductivity and thus a significant loss factor $\epsilon''$ which is often greater in magnitude than $\epsilon'$. Since loss factor is necessarily measured to some extent when attempting to measure $\epsilon'$, the attainment of accurate values of $\epsilon'$ has been largely frustrated by the presence of a significant loss factor.

The U.S. Pat. No. 3,551,797 of Gouilloud et al. teaches a technique wherein high frequency electromagnetic energy is emitted into a formation. The resultant propagated electromagnetic waves are measured to determine properties of the formation through which the waves have passed. The patent disclosure is largely concerned with determining formation conductivity which is achieved by indirectly measuring the "skin depth" of the traversed formation. It is instructive as background herein to examine the theory underlying the skin depth measurement of that patent which is described briefly as follows: The magnetic field strength $H_z$ at a distance $z$, for large values of $z$, from a transmitter, is expressed in Gouilloud et al as $$H_z = H_o e^{-\frac{z}{\delta}(1+j)} \qquad (1)$$

where $e$ is the natural logarithm base, $H_o$ is the magnetic field strength at the transmitter, and $\delta$ the skin depth defined as $$\delta = \sqrt{\frac{2}{\omega\mu\sigma}} \qquad (2)$$

where $\omega$ is the radian frequency of the transmitter signal, $\mu$ is the magnetic permeability of the formation, generally considered a constant, and $\sigma$ is the conductivity of the formation. (A similar equation could be set forth to express the electric field.) Equation (1) indicates that the electromagnetic field is attenuated and phase shifted as the distance term $z$ increases; i.e., as the electromagnetic energy propagates through the formations. The degree of phase shift is expressed by the term $-j(z/\delta)$ and the degree of attenuation expressed by the term $-(z/\delta)$. The composite term $(1/\delta)(1+j)$ is defined as the propagation constant, the term $1/\delta$ being the attenuation constant and the term $j(1/\delta)$ being the phase constant.

In the Gouilloud et al patent, the attenuation constant and the phase constant are indicated as having the same magnitude and, consequently, skin depth can be determined from either attenuation measurements or phase measurements. The attenuation calculation involves the measurement of the amplitude of the electromagnetic energy at receiving locations spaced a distance $\Delta l$ apart in the formation. The amplitudes at the two receiving locations, designated $A_1$ and $A_2$, are used to calculate the skin depth $\delta$ in accordance with the relationship $$\frac{A_2}{A_1} = e^{-\frac{\Delta l}{\delta}}$$

Alternately, the phase difference between the two receiving locations, designated as $\Delta\phi$, is used to calculate skin depth in accordance with the relationship $$\Delta\phi = \frac{\Delta l}{\delta}$$

Knowing $\delta$, the conductivity of the formation, $\sigma$, is determined from equation (2).

The described technique of Gouilloud et al is predicated on the substantial equality of the attenuation and phase constants of the electromagnetic energy. This assumption holds whenever $$\frac{\sigma}{\omega\epsilon} >> 1$$

where $\epsilon$ is the dielectric constant of the material through which the wave is propagating. The term $\sigma/\omega\epsilon$, known as the "loss tangent", is the ratio of a quantity that relates to lossy conduction currents ($\sigma$) with respect to a quantity that relates to displacement currents ($\omega\epsilon$). (Note that the loss tangent, a measure of relative conduction losses, contributes to the loss factor term $\epsilon''$ introduced above.) Thus, if $\sigma$ is substantial, and the operating frequency relatively low, the propagation constant of the electromagnetic wave has little dependence upon the material's true dielectric constant. This is evidenced by equation (2) (which does not depend upon dielectric constant) and the subsequent Gouilloud et al expression for propagation constant, $(1/\delta)(1+j)$.

As was initially stated, past attempts at determining true dielectric constant have met little success. It is an object of the present invention to utilize a propagating electromagnetic wave type of technique to determine the true dielectric constant of a subsurface formation under investigation.

SUMMARY OF THE INVENTION

The present invention is directed to a method and apparatus for investigating earth formations surrounding a borehole by injecting microwave electromagnetic energy into the formations and then taking measurements which relate to the propagation of such energy in the formations. In the preferred form of the invention, the injected microwave energy establishes a lateral wave which travels in the formations adjacent the interface between the mudcake and the formations. Energy signals from the lateral wave are received at first and second receiving locations. The phase difference between signals received at the first and second receiving locations is measured. Also measured is the relative attenuation as between signals received at the two receiving locations. The loss-corrected dielectric constant associated with the formations surrounding the area between the first and second receiving locations is then obtained by judiciously combining the phase and attenuation measurements.

Further features and advantages of the invention will be more readily understood from the following detailed description when taken in conjunction with the accompanying drawings.

DESCRIPTION OF THE PREFERRED EMBODIMENTS

Figure 1:
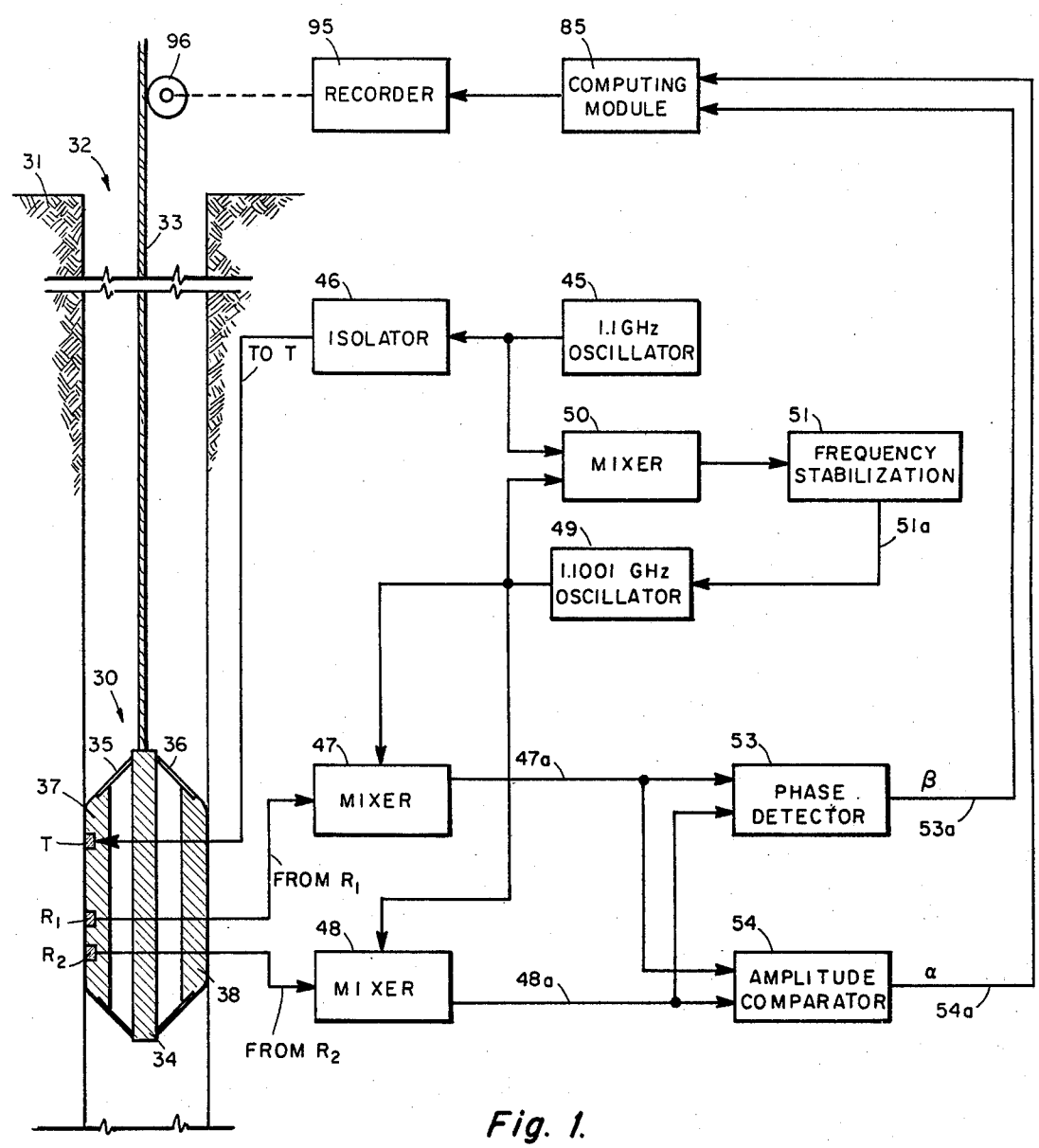
FIG. 1 is a schematic representation, partially in block diagram form, of an embodiment of the invention.

Consider a plane electromagnetic wave propagating in a lossless dielectric medium. The wave propagates with a velocity $$v = \frac{1}{\sqrt{\mu\epsilon}} \qquad (3)$$

where $\mu$ is the magnetic permeability and $\epsilon$ the dielectric constant of the medium. If the type of materials under consideration are generally non-magnetic, $\mu$ can be considered as a known constant and $\epsilon$ can be determined from the relationship $$\epsilon = \frac{1}{\mu v^2}.$$

Next, consider two points in fixed space relation along the direction of propagation of the wave. For a given angular frequency, $\omega$, the phase difference of the wave as between the two points is $$\phi = \frac{\omega L}{v} = \beta L$$

where L is the distance separating the two points and $\beta$ is the phase constant of the wave as defined by $\beta = \omega/v$. Substituting from equation (3) it is seen that $\epsilon$ can be obtained after determination of the phase constant from the relationship $\beta = \omega\sqrt{\mu\epsilon}$ as $$\epsilon = \frac{\beta^2}{\omega^2\mu}. \qquad (4)$$

In terms of the phase measured between two points the appropriate expression is $$\epsilon = \frac{\phi^2}{\omega^2 L^2 \mu}. \qquad (5)$$

The preceding relationships are valid for a lossless material, but subsurface media of interest generally have appreciable conductivity. The propagation constant, $\gamma$, of a plane electromagnetic wave propagating in a lossy medium is a complex quantity of the form $$\gamma = \omega\sqrt{\mu\epsilon}\sqrt{1+j\frac{\sigma}{\omega\epsilon}} \qquad (6)$$

where $\sigma$ is the conductivity of the medium. When $\sigma/\omega\epsilon$ is much greater than 1, the propagation constant reduces to the form set forth above in the Background. For the case where $\sigma$ is zero or very small, the "loss tangent" term $\sigma/\omega\epsilon$ can be neglected and we have $\gamma = \beta = \omega\sqrt{\mu\epsilon}$ which is consistent with equation (4) for the lossless case. When $\sigma$ is significant, however, the loss tangent term can be kept relatively small by having $\omega$ very large. In such case, the equation (4) is again approximately valid. For example, when $\sigma/\omega\epsilon = 0.2$, a calculation of $\epsilon$ in accordance with equation (4) yields only about a 0.5% error as compared to the case where $\sigma/\omega\epsilon$ is zero.

As discussed hereinafter, there are practical limits on how high a frequency can be used in making meaningful measurements in a borehole. Thus, for formations of appreciable conductivity, the use of the highest practical frequencies may still result in a significant loss tangent which, if ignored, will lead to error in measuring the apparent value of dielectric constant. In an embodiment of the present invention, measurements are automatically corrected for loss tangent. To visualize the correction it is helpful to represent the real and imaginary parts of the propagation constant $\gamma$ as $\beta$ and $\alpha$, respectively, so we have $$\gamma = \beta + j\alpha \qquad (7)$$

where $\alpha$ is associated with wave attenuation or loss. (note that the propagation constant is used in the wave equation in the form $e^{j\gamma}$, so the real part of the propagation constant becomes the imaginary part of the exponent and vice versa.) Squaring equations (6) and (7) and equating the real parts of each gives $$\beta^2 - \alpha^2 = \mu\epsilon\omega^2. \qquad (8)$$

Now, if we take the $\beta$ of equation (4) and substitute therefor a general "corrected" value, called "$\beta_{corr}$", which takes loss into account, we have $$\beta_{corr.} = \omega \sqrt{\mu\epsilon.} \qquad (9)$$

From equation (8) it is seen that the appropriate value for $\beta_{corr.}$ is $$\beta_{corr.} = \sqrt{\beta^2 - \alpha^2}. \qquad (10)$$

In an embodiment of the invention the $\beta$ and $\alpha$ of equation (10) are measured values, $\beta$ being determined from a velocity or phase measurement and $\alpha$ from an attenuation measurement. The appropriate value for $\beta_{corr.}$ is then determined using equation (10) and the compensated value of dielectric constant obtained from equation (9). In terms of the above-discussed complex quantity representation of dielectric constant (i.e., $\epsilon^* = \epsilon' + j\epsilon''$), the value of dielectric constant determined in the described manner corresponds to $\epsilon'$; i.e., the dielectric constant of the material under investigation if it were lossless.

Referring to FIG. 1, there is shown a representative embodiment of an apparatus in accordance with the present invention for investigating subsurface formations 31 traversed by a borehole 32. The borehole 32 is typically filled with a drilling fluid or mud which contains finely divided solids in suspension. The investigating apparatus or logging device 30 is suspended in the borehole 32 on an armored cable 33, the length of which substantially determines the relative depth of the device 30. The cable length is controlled by suitable means at the surface such as a drum and winch mechanism (not shown).

The logging device 30 includes an elongated cylindrical support member 34, the interior portion of which has a fluid-tight housing containing the bulk of the downhole electronics. Mounted on support member 34 are a pair of bowed springs 35 and 36. The spring 35 has mounted thereon a pad member 37 which contains, inter alia, a transmitting antenna T and vertically spaced receiving antennas $R_1$ and $R_2$. Mounted on the spring 36 is a secondary pad member 38 which may be an inactive pad that facilitates smooth vertical movement of the device 30 through the borehole. If desired, however, the pad 38 may contain electrodes or like additional means for investigating the surrounding formations. Electronic signals indicative of the information obtained by the logging device are transmitted through the cable 32 to a computing module 85 and recorder 95 located at the surface of the earth. The particular means shown in FIG. 1 for maintaining the antennas in engagement with the borehole wall is illustrative, and it will be appreciated that other suitable means for accomplishing this objective, such as hydraulic means, can be utilized.

Figure 2:
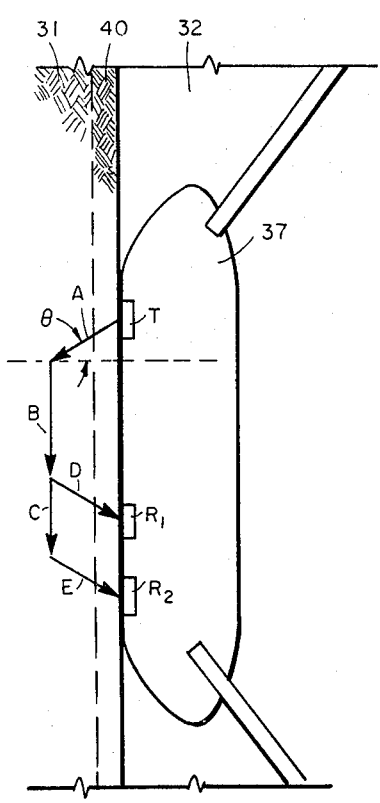
FIG. 2 and 2A help illustrate, in simplified form, the nature of propagation of an electromagnetic lateral wave in a formation.
Figure 2A:
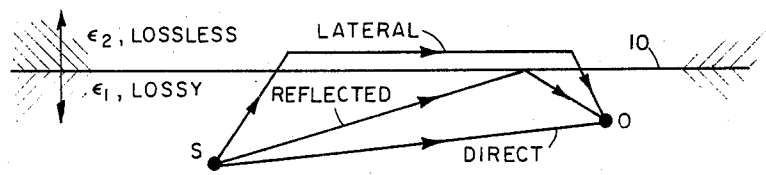

FIG. 2 and 2A illustrates, in simplified form, the nature of propagation of the electromagnetic wave to be measured with the apparatus of FIG. 1. In FIG. 2 the pad 37 is shown positioned against the side of the borehole 32 which, as above-stated, is filled with a drilling mud. Generally, the fluid pressure in the formations traversed by a borehole is less than the hydrostatic pressure of the column of mud in the borehole, so that the mud and mud filtrate flows somewhat into the formations. The formations tend to screen the small particles suspended in the mud so that a mudcake is formed on the walls of the borehole. The thickness of the mudcake varies with formation parameters such as permeability, but at least a very thin mudcake is usually present on the borehole wall. In FIG. 2, the pad 37 contacts a mudcake 40 which is shown as being of exaggerated scale thickness for illustrative clarity.

The transmitting antenna T emits microwave electromagnetic energy into the formation as represented by the arrow A. To understand the nature of the wave which propagates to the receivers, refer momentarily to FIG. 2A wherein there is shown an interface 10 between a lower lossy halfspace of dielectric constant $\epsilon_1$ and a lossless upper halfspace of dielectric constant $\epsilon_2$. It has been shown that the energy passing from a dipole-excited source $s$ to an observation point O is definable as a "ground wave" which consists of three basic waves shown in FIG. 2A as "direct," "reflected," and "lateral" waves. The lateral wave constitutes the dominant portion of the field at and close to the interface, especially when the distance between points $s$ and O is large as compared to their respective distances from the interface. The lateral wave starts at the source in the lossy media and proceeds as a ray toward the interface in a direction associated with the critical angle which is defined by $$\sin\theta = \sqrt{\frac{\epsilon_2}{\epsilon_1}}.$$

The wave travels along the boundary but within the lossless media and it continuously sheds energy back into the lossy medium. The direct and reflected waves are confined to the lossy media. These waves are attenuated at an exponential rate which is must faster than the algebraic rate at which the lateral wave is attenuated.

The principles of the idealized situation of FIG. 2A can be applied to a case where the upper half-space is a relatively low-loss medium, provided the dielectric constant of the upper half-space is smaller than that of the lower half-space. In FIG. 2, the conditions necessary for the excitation of lateral waves are generally present when a water-base mud is being used. Water-base muds have a relatively high conductivity, and mudcakes formed therefrom can be expected to have a relatively high dielectric constant (due to a high water content) as well as a relatively high conductivity. Thus, the mudcake can be thought of as the lossy lower half-space and the adjacent formation as a relatively low-loss upper half-space. Since it is expected that the dielectric constant of the mudcake will be considerably higher than that of the adjacent formation, the critical angle (i.e., the angle at which the energy in the lateral wave enters the formation) will be relatively small.

The lateral wave propagating in the formation is represented by the arrow B and its extension, arrow C. As above-stated, the lateral wave continuously sheds energy back into the more lossy media, and the portions of energy which are shed at the approximate locations of the receivers $R_1$ and $R_2$ are represented by the arrows D and E, respectively. If the pathlengths represented by arrows D and E are assumed to be substantially equal, it is seen that the difference in pathlength between the energy received at $R_1$ (via path A-B-D) and the energy received at $R_2$ (via path A-B-C-E) is the distance represented by arrow C; i.e., the distance between the receivers. Accordingly, a differential receiver arrangment allows investigation of the portion of the formation lying approximately opposite the separation between $R_1$ and $R_2$.

In a simplified illustration of FIG. 2, account is not taken of the "flushed" or "invaded" zone which surrounds the mudcake in the borehole. As is well known, the invaded zone contains fluids from the mud which filter through the mudcake into the surrounding formations. The depth of invasion of this zone generally varies from about an inch or so to a few feet depending upon such factors as the plastering qualities of the mud and the lithology of the formations. When the depth of the invaded zone is relatively large, for example a foot or more, the lateral wave generally travels through this zone in the manner represented by the situation of FIG. 2. The dielectric constant determined with the logging apparatus is thus that of the invaded formation, and this information can be gainfully utilized in conjunction with other data to determine formation parameters such as porosity or lithology. When the depth of the invaded zone is relatively small, for example two inches, a significant lateral wave can be established in the "clean" formation which lies outside the invaded zone. This situation is illustrated in simplified form in the diagram of FIG. 3. When a water-based mud is employed, the fluid-content of the invaded zone 41 generally renders the zone of substantially higher conductivity and dielectric constant than the clean formation. Therefore, in FIG. 3, the invaded zone 41 can be thought of as the lossy lower half-space and the adjacent clean formation as a relatively low-loss upper half-space in analogy to FIG. 2A. A lateral wave can thus be established in the clean formation at the boundary with the invaded zone as is shown by the arrow 42.

Figure 3:
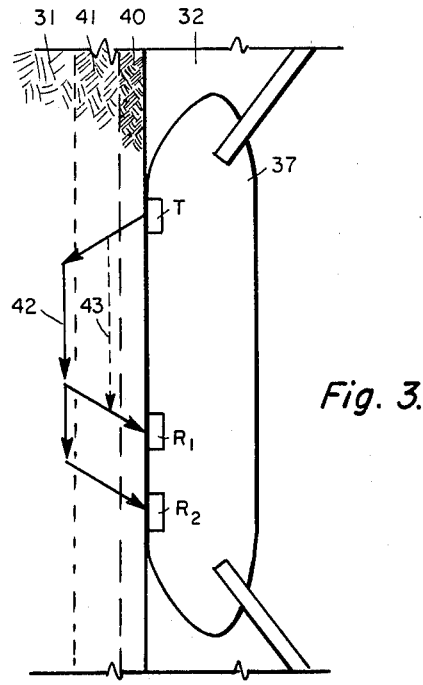
FIG. 3 helps illustrate, in simplified form, the propagation of an electromagnetic lateral wave in a "clean" formation zone.

In order for a significant lateral wave to be established in the clean formation in the situation of FIG. 3, the distance between T and $R_1$ must be large as compared to the depth of invasion. As will be discussed hereinafter, there are practical limitations on the maximum spacing between transmitter and receivers which can be successfully employed in an apparatus of the type being considered. Also, it will be appreciated that even if a significant lateral wave can be established in the clean formation, a second lateral wave (shown in FIG. 3 as the dashed arrow 43) may be established within the invaded zone at the boundary with the mudcake. The presence of two possible lateral waves can give rise to problems in interpreting results. For reasons such as these, the preferred embodiment of the invention utilizes a relatively short spacing between the transmitter and the receivers and is intended to establish the only significant lateral wave at the boundary of the formation nearest the mudcake; i.e., within the invaded zone. It will be appreciated, however, that the principles set forth herein can, if desired, be utilized in investigating the properties of the clean formation.

Referring again to FIG. 1, the downhole electronics contained within the member 34 are shown, for convenience of illustration, at the side of the borehole. A solid state oscillator 45 provides output energy in the microwave region of the spectrum. The microwave region is defined herein as including the range of frequencies between about 300 MHz. and 300 GHz. The oscillator 45 may operate at the suitable frequency, of 1.1 GHz; i.e., $1.1 \times 10^9$ cycles per second. Discussion of the choice of suitable frequencies will follow hereinafter. The output of oscillator 45 is coupled through an isolator 46 to the transmitting antenna T. Microwave energy is transmitted into the surrounding formations and propagates through the formations in the manner previously described. The energy which arrives at the receiving antennas $R_1$ and $R_2$ is respectively coupled to input terminals of the mixers 47 and 48. As discussed above, the signals which arrive from $R_1$ and $R_2$ are out of phase with each other by an amount which depends on the phase constant $\beta$ and have an amplitude ratio which depends upon the attenuation constant $\alpha$. Secondary input terminals of the mixers are supplied with microwave energy at a frequency that is separated from the transmitter frequency by some relatively low frequency which is typically in the radio frequency range. In the embodiment shown, a solid state oscillator 49 supplies microwave energy to mixers 47 and 48 at a frequency of 1.1001 GHz, or 100 KHz above the transmitter frequency. The output signals 47A and 48A of the mixers 47 and 48 therefore contain the difference frequency of 100KC. In accordance with well known principles, the signals 47A and 48A maintain the phase and amplitude relationships of the signals from $R_1$ and $R_2$, but the task of phase detection is greatly facilitated at the lower frequency of the mixed signals. To insure that the difference frequency between the outputs of the oscillators 45 and 49 remains at 100 KHz, the oscillator outputs are sampled and fed to a mixer 50. The output of the mixer is received by a frequency stabilization circuit 51 which detects drifts from the 100KC standard and generates a correction signal 51A which controls oscillator 49 in the manner of a conventional "phase-locked loop."

Figure 4:
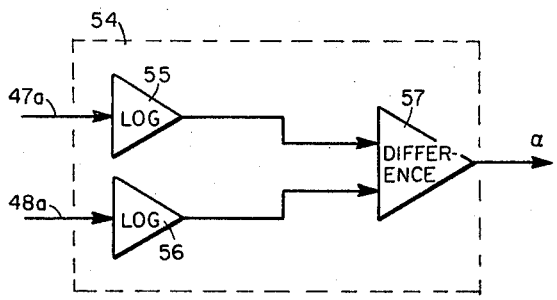
FIG. 4 is a block diagram of the amplitude comparator of FIG. 1.

The signals 47A and 48A are applied to a phase detector circuit 53 and to an amplitude comparator 54. The output of the phase detector 53 is a signal level which is proportional to the phase difference $\phi$ between the signals received at $R_1$ and $R_2$, and thus proportional to $\beta$ in accordance with $\beta = \phi/L$, where $L$ is the distance separating the two receivers. As indicated above, in instances where the loss tangent is much less than unity, this $\beta$, which is a measure of velocity, can be used to determine dielectric constant, as is clear from equation (3) and the equations which follow equation (3) for the lossless case. The output of amplitude comparator 54 is a signal level which is proportional to the attenuation constant $\alpha$. A convenient circuit 54 for obtaining an output signal proportional to $\alpha$ is shown in FIG. 4. The signals 47A and 48A are respectively applied to the logarithmic amplifiers 55 and 56 whose outputs are fed to the difference amplifier 57. The output of the difference amplifier 57 is a signal level proportional to $\alpha$. This can be visualized by representing the amplitude of the wave energy received at $R_1$ as $Ae^{-\alpha z}$, where $A$ is an amplitude constant and $z$ is the distance separating T and $R_1$. It follows that the amplitude of the wave energy received at $R_2$ is $Ae^{-\alpha(z+L)}$, where $L$ is the distance separating the receivers $R_1$ and $R_2$. The ratio of the wave amplitudes at the two receivers is therefore $$\frac{Ae^{-\alpha(z+L)}}{Ae^{-\alpha z}} = e^{-\alpha L}.$$

The log of the ratio of the wave amplitudes is therefore proportional to $\alpha$. It will be appreciated that the circuit 54 of FIG. 4 accomplishes the same mathematical result by taking the difference of the logs of the wave amplitudes.

The outputs of the phase detector circuit 53 and the amplitude comparison circuit 54 are transmitted to the surface over the conductor pair 53A and 54A which in actuality pass through the armored cable 33. Typically, these signals are D.C. levels which are stepped-up by amplification before transmission to the surface.

At the surface of the earth the signals on lines 53A and 53B are applied to a computing module 85 which computes the loss-corrected value of the dielectric constant measured by the downhole investigating apparatus in accordance with the equations (8) and/or (9) and (10). The computed dielectric constant is recorded by a recorder 95 that is conventionally driven as a function of borehole depth by mechanical coupling to a rotating wheel 96. The wheel 96 is coupled to the cable 33 and rotates in synchronism therewith so as to move as a function of borehole depth. Thus, the loss-corrected dielectric constant is recorded as a function of borehole depth by the recorder 95.

Figure 5:
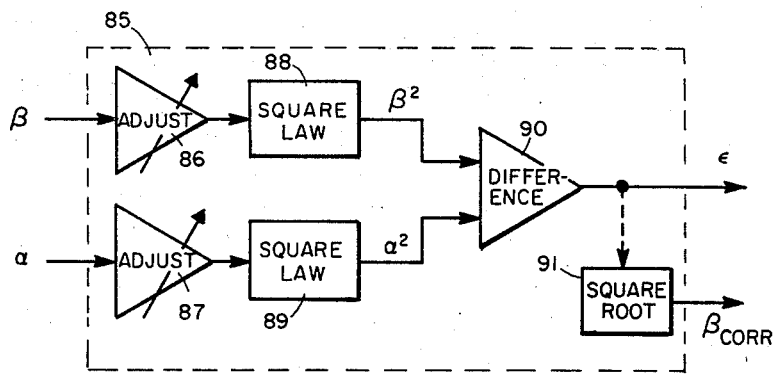
FIG. 5 is a block diagram of the computing module of FIG. 1.

FIG. 5 is a block diagram of the computing module 85 which receives the signals on lines 53A and 54A that are indicative of measured values of $\beta$ and $\alpha$, respectively. The signals are first applied to variable gain amplifiers 86 and 87 which can be utilized for calibration. The amplifier outputs are fed to conventional square law circuits 88 and 89 which produce signals proportional to $\beta^2$ and $\alpha^2$. These signals are applied to a difference amplifier 90 which produces an output proportional to $\beta^2 - \alpha^2$. From equation (8), it is clear that this output is a measure of $\epsilon$, since equation (8) can be rewritten as $$\epsilon = \frac{\beta^2 - \alpha^2}{\mu\omega^2}.$$

Calibration for particular system parameters such as frequency can be accomplished with the amplifiers 86 and 87. If desired, the output of difference amplifier 90 can be applied to a circuit 91 having a square root characteristic. The resultant output represents $\beta_{corr}$ in accordance with equation (10), and this output can be plotted on the recorder 95 in addition to or in place of the loss-corrected dielectric constant.

Figure 6:
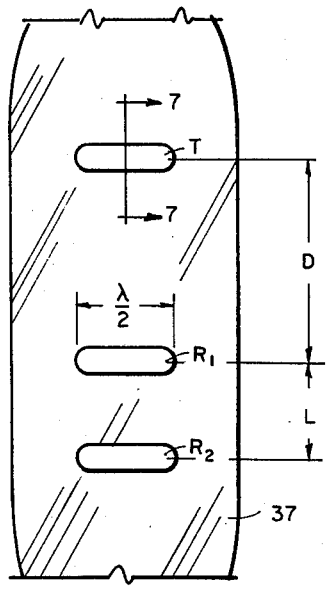
FIG. 6 is a fragmentary side elevational view of the wall-engaging face of the pad member of FIG. 1.

Referring now to FIG. 6, there is shown a fragmentary side elevational view of the wall-engaging face of the pad 37 which includes antennas T, $R_1$ and $R_2$. It has been found that cavity-backed slot antennas are particularly effective in setting up and receiving the desired lateral wave in the information. The cavity openings seen in FIG. 6 are filled with a water-tight ceramic insulating material.

In the instant embodiment the length of the slot is $\lambda/2$, i.e., about 7.5 cm. for an operating frequency of 1.1 GHz (in an insulating material having a dielectric constant of 4). The distance D separating T and $R_1$ is 8 cm. and the distance L between receivers is 4 cm. Further discussion of operating frequency and dimensions follows hereinafter.

Figure 7:
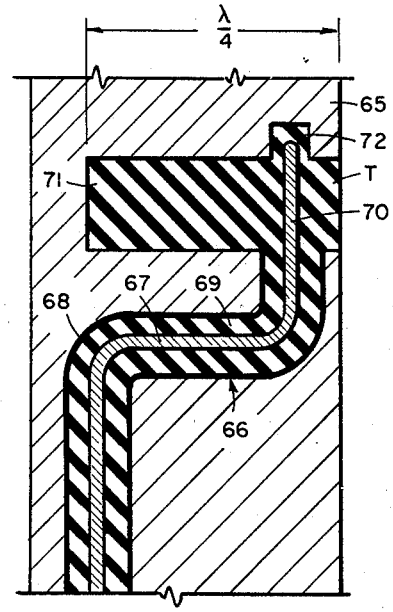
FIG. 7 is an enlarged, fragmentary sectional view taken along lines 7—7 of FIG. 6.

FIG. 7 is an enlarged, fragmentary, sectional view taken along lines 7—7 of FIG. 6 and shows the antenna T as extending a cavity depth of $\lambda/4$, or about 3.75 cm., into a conductive metal housing 65. A coaxial cable 66 couples the isolator 46 (FIG. 1) to the antenna T. The cable 66 includes an inner conductor 67 and an outer conductor shell 68 which is typically filled with an insulating material 69. A probe 70 extends vertically into the cavity 71 as a continuation of center conductor 67. The probe 70 typically terminates in a small insulator-filled cylindrical recess 72 at the top of the cavity.

The receiving antennas $R_1$ and $R_2$ may be of similar construction to that of the transmitter antenna shown in FIGS. 6 and 7. The receivers are coupled via coaxial cable to the mixers 46 and 47 of FIG. 1. The three coaxial cables may be run through a single reinforced cable that connects the pad 37 with the member 34 which contains the bulk of the downhole electronics.

Now concerning the selection of operating frequency and of the apparatus dimensions, it will be recalled from the discussion following equation (4) that it is advantageous to utilize a very high $\omega$ in order to minimize the loss tangent. It has been demonstrated for salt water-saturated rock, for example, sandstone, that the lossy component of the dielectric constant, $\epsilon''$ (again, in terms of the previously introduced complex quantity $\epsilon^* = \epsilon' + j\epsilon''$), is greater than $\epsilon'$ at frequencies below about 100 Megahertz. Above this frequency $\epsilon''$ continues to decrease and in the range above about 500 MHz the value of $\epsilon'$ becomes greater than $\epsilon''$, so that the measurement of $\epsilon'$ becomes an easier task. This phenomenon is disclosed, for example, in British Pat. No. 1,088,824 wherein a technique is set forth for causing a portion of subsurface formation to act as the dielectric material between plates of a capacitor, the logging tool electrodes acting as "plates." This type of technique, as well as related schemes where it is attempted to have the formation act as a transmission line filler or termination, have not, to applicant's knowledge, led to a commercially acceptable logging device. As operating frequency increases into the GHz range, $\epsilon'$ becomes substantially greater than $\epsilon''$. This appears favorable to the selection of higher frequencies, but practical considerations suggest that there are upper limits on operating frequency. One such consideration is the increasing contribution to $\epsilon''$ from dipolar relaxation losses as frequency is increased substantially above 1 GHz. Another consideration is the effect of the mudcake on the establishment of the desired lateral wave in the formation. For frequencies in the GHz range, the wavelength of the propagating energy is quite small and begins to approach the higher thicknesses of mudcake normally encountered. When this occurs, the mudcake tends to act in the manner of a waveguide by propagating a portion of the transmitted energy. It thereby decreases the amount of energy available to form the lateral wave.

The foregoing mudcake effect begins to become serious when the half-wavelength of energy transmitted into the mudcake approaches the thickness of the mudcake. To make a rough estimated calculation, assume that the maximum mudcake thickness to be encountered is about 2 cm. and that the maximum dielectric constant of the mudcake is about 20. This would mean that the maximum free-space half wavelength $\lambda_0/2$ which satisfies the condition is $$\frac{\lambda_o}{2} = (2 \text{ cm}) (\sqrt{20}) = 9 \text{ cm., or } \lambda_o = 18 \text{ cm.},$$

which corresponds to a frequency of about 2 GHz. From these considerations it is established that the optimum range runs from somewhat above 500 MHz. to somewhat below 2 GHz. The 1.1 GHz. frequency utilized in the described embodiment falls centrally in this range and has been found satisfactory.

The selection of apparatus dimensions is dictated by practical considerations, some of which have already been treated. Regarding the distance D separating T and $R_1$ (FIG. 6), it follows from discussion above with reference to FIGS. 2 and 2A that in establishing a dominant lateral wave it is desirable to have the distance D be large as compared to the mudcake thickness. However, if D is made too large, attenuation of the wave over a substantial traveling distance renders accurate measuring difficult. In the illustrated embodiment, the suggested D of 8 cm. (four times the generally expected maximum mudcake thickness) was found satisfactory, but it will be appreciated that some flexibility in this dimension is available.

The distance L between receivers must be large enough to enable the distinguishing of a suitable range of phase shifts and small enough so that unnecessary ambiguities of measurement are avoided. An operating frequency of 1.1 gHz corresponds to a free-space wavelength of about 27 cm. The phase shift associated with a separation of L cm. in free space is, therefore $$\phi_{free\ space} = \frac{360°}{27} \cdot L = 13.3°(L). \qquad (11)$$

At high frequencies, the phase shift $\phi m$ is approximately proportional to the square root of the dielectric constant $\epsilon_m$ of the medium of travel (see e.g. equation (3)), so the general relationship which follows from equation (11) is:

$$\phi_m \simeq \frac{360°}{27} \sqrt{\epsilon_m}(L) = 13.3° \sqrt{\epsilon_m}(L). \qquad (12)$$

The lowest dielectric constant generally expected to be encountered in subsurface formations is about 4, which occurs for a non-porous quartz matrix. This value yields an approximate minimum phase shift $\phi_{min}$ for a separation length L of $$\phi_{min} \simeq 13.3° \sqrt{4}(L) = 26.6° (L). \qquad (13)$$

The highest generally expected dielectric constant occurs for about 35% porosity limestone fully saturated with water. The phase delay of the microwave energy in a composite formation is the volume weighted sum of the delay in the pore fluid and the delay in the solid matrix. The effective maximum dielectric constant $\epsilon_{max}$ is thus determinable from the approximate relationship $$\sqrt{\epsilon_{max}} \simeq 0.35 \sqrt{\epsilon_{water}} + 0.65 \sqrt{\epsilon_{limestone}}$$
$$\simeq 0.35 \sqrt{80} + 0.65 \sqrt{7.5}$$

from which $\epsilon_{max}$ is calculated to be about 30. Therefore, using equation (12), the maximum phase shift for separation length L is $$\phi_{max} \simeq 13.3° (\sqrt{30}) (L) \simeq 73.2° (L). \qquad (14)$$

From equations (13) and (14) it is seen that the suggested separation of L = 4 cm. for the illustrated embodiment is appropriate. This value of L yields minimum and maximum phase shifts of about 106° and 293°, respectively. In this range, phase shifts can be interpreted with good resolution (over almost a 200° range) but without ambiguity which arises when more than 360° of range is allowable. Also, the separation of 4 cm. does not give rise to any particular problem of over-attenuation and has been found satisfactory. It should be again pointed out, however, that some flexibility of choice for this dimension exists within reasonable bounds of the practical considerations set forth herein.

From the foregoing it should be evident that using the dielectric constant measured in accordance with the principles of the invention, useful information about porosity, lithology or water saturation can be obtained. If the dielectric constant of a composite formation is designated by $\epsilon_c$ and the dielectric constant of the component solid matrix and pore fluid are designated by $\epsilon_m$ and $\epsilon_f$, respectively, it follows from the above that $$\sqrt{\epsilon_c} = (1-\phi) \sqrt{\epsilon_m} + \phi \sqrt{\epsilon_f} \qquad (15)$$

where $\phi$ is the porosity of the matrix. If $\epsilon_m$ and $\epsilon_f$ are determinable from other logging information, porosity would be calculable after measurement of $\epsilon_c$. Thus, for example, if it is known that the formation consists of limestone ($\epsilon_m = 7.5$) 100% saturated with water ($\epsilon_f = 80$), porosity could be determined from the relationship $$\sqrt{\epsilon_c} = (1+\phi) \sqrt{7.5} + \phi \sqrt{80}.$$

It is also readily seen that if porosity has been previously determined, useful information about saturation or lithology can be calculated by obtaining the dielectric constant of the composite formation.

Equation (15) can be rewritten in the following form:

$$\phi = \frac{\sqrt{\epsilon_c} - \sqrt{\epsilon_m}}{\sqrt{\epsilon_f} - \sqrt{\epsilon_m}} \qquad (16)$$

Figure 8:
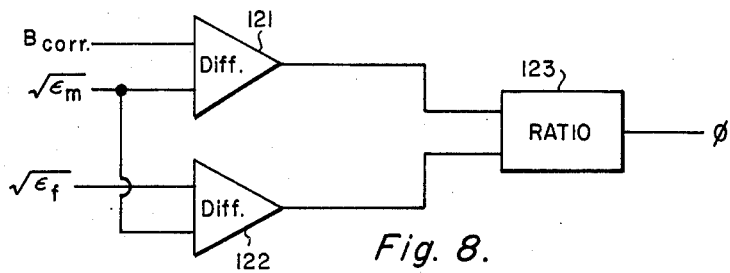
FIG. 8 discloses a block diagram of a circuit for computing porosity.

This equation is used to compute porosity with the circuitry shown in FIG. 8 which can be considered as an additional portion of the computing module 85 (FIG. 1). The output of square root circuit 91 represents $\beta_{corr}$ which is seen from equation (9) to be proportional to $\sqrt{\epsilon_c}$. In cases where $\sqrt{\epsilon_m}$ and $\sqrt{\epsilon_f}$ are determinable from other logging or coring information, voltages proportional to these quantities can be applied to the appropriate input terminals of difference amplifiers 121 and 122 as shown. The outputs of these difference amplifiers are respectively proportional to the numerator and denominator of equation (16). Ratio circuit 123 receives the two outputs and generates a voltage which represents the porosity $\phi$ of the composite formation.

I claim:

1. Apparatus for investigating earth formations surrounding a borehole to obtain an indication of the dielectric constant of the formations, comprising:
   a. a member adapted for engagement with the borehole wall;
   b. means mounted in said member for injecting microwave electromagnetic energy into the surrounding formations;
   c. first and second receiving antennas mounted in spaced relation on the wall-engaging face of said member for receiving said microwave electromagnetic energy; and
   d. means coupled to said antennas for measuring the velocity of propagation of the microwave electromagnetic energy received at said first and second antennas, said velocity being indicative of the dielectric constant of the formations surrounding the first and second antennas.

2. Apparatus as defined by claim 1 further comprising means coupled to said first and second antennas for measuring the attenuation of said microwave electromagnetic energy as it traverses the formations surrounding the first and second antennas.

3. Apparatus as defined by claim 2 further comprising computing means for combining said velocity measurement with said attenuation measurement to compute a loss-corrected value of the dielectric constant of the formations surrounding the first and second antennas.

4. Apparatus for investigating earth formations surrounding a borehole which contains drilling mud and has a mudcake formed on a substantial portion of its walls, to obtain an indication of the dielectric constant of the formations, comprising:
   a. a member adapted for engagement with the borehole wall;
   b. means positionable in the borehole for injecting microwave electromagnetic energy into the surrounding formations and for establishing a lateral wave of such energy within the surrounding formations, said lateral wave traveling adjacent the interface between the mudcake and the formations;
   c. first and second receiving antennas mounted in spaced relation on the wall-engaging face of said member for receiving said microwave electromagnetic energy; and
   d. means coupled to said antennas for measuring the velocity of propagation of said lateral wave received at said first and second antennas, said velocity being indicative of the dielectric constant of formations surrounding the first and second antennas.

5. Apparatus for investigating earth formations surrounding a borehole to obtain an indication of the dielectric constant of the formations, comprising:
   a. a member adapted for engagement with the borehole wall;
   b. means mounted in said member for injecting microwave electromagnetic energy into the surrounding formations;
   c. first and second receiving antennas mounted in spaced relation on the wall-engaging face of said member for receiving said microwave electromagnetic energy; and
   d. means coupled to said antennas for measuring the phase difference between signals received at said first and second antennas, said phase difference being indicative of the dielectric constant of the formations surrounding said first and second antennas.

6. Apparatus as defined by claim 5 wherein said means for injecting energy into the surrounding formations comprises a transmitting antenna mounted on the wall-engaging face of said member and means for supplying microwave electromagnetic energy to said transmitting antenna.

7. Apparatus as defined by claim 6 wherein said microwave electromagnetic energy has a frequency within the range of 500 MHz. and 2.0 GHz.

8. Apparatus as defined by claim 6 wherein said microwave electromagnetic energy has a frequency of about 1.1 GHz.

9. Apparatus as defined by claim 6 further comprising means coupled to said receiving antennas for measuring the relative attenuation as between signals received at said first and second receiving antennas.

10. Apparatus as defined by claim 6 wherein said transmitting antenna is a cavity-backed slot antenna.

11. Apparatus as defined by claim 10 wherein said receiving antennas are cavity-backed slot antennas.

12. Apparatus as defined by claim 9 further comrpising computing means for combining said phase difference measurement with said attenuation measurement and for computing a corrected value of the phase constant associated with the formations surrounding the area between said first and second receiving antennas.

13. Apparatus as defined by claim 9 further comprising computing means for combining said phase difference measurement with said attenuation measurement and for computing a loss-corrected value of the dielectric constant associated with the formations surrounding the area between said first and second receiving antennas.

14. Apparatus as defined by claim 7 further comprising means for computing a corrected value $\beta_{corr.}$ for the phase constant associated with the formations surrounding the area between said first and second receiving antennas in accordance with the relationship $$\beta_{corr.} = \sqrt{\beta^2 - \alpha^2}$$

where $\beta$ and $\alpha$ are, respectively, phase and attenuation constants determined by said phase difference measuring means and said attenuation measuring means.

15. Apparatus as defined by claim 7 further comprising means for computing a loss-corrected value $\epsilon$ for the dielectric constant associated with the formations surrounding the area between said first and second receiving antennas in accordance with the relationship $$\epsilon = \frac{\beta^2 - \alpha^2}{\mu \omega^2}$$

where $\beta$ and $\alpha$ are, respectively, phase and attenuation constants determined by said phase difference measuring means and said attenuation measuring means, $\omega$ is the angular frequency of the transmitted microwave energy, and $\mu$ is a constant associated with the magnetic permeability of the surrounding formations.

16. Apparatus as defined by claim 9 further comprising means for combining said phase difference measurement with said attenuation measurement to generate a signal representative of a corrected value of the phase constant associated with the formations surrounding the area between said first and second receiving antennas.

17. Apparatus as defined by claim 9 further comprising means for combining said phase difference measurement with said attenuation measurement to generate a signal representative of a loss-corrected value of the dielectric constant associated with the formations surrounding the area between said first and second receiving antennas.

18. A method of determining the dielectric constant of formations surrounding a borehole, comprising the steps of:
   a. injecting microwave electromagnetic energy into the formations surrounding the borehole to establish a lateral wave in the surrounding formations;
   b. receiving wave energy from said lateral wave at first and second receiving locations within the borehole; and
   c. measuring the phase difference between wave energy received at said first and second receiving locations, said phase difference being indicative of the dielectric constant of the formations surrounding the area between the first and second receiving locations.

19. The method as defined by claim 18 further comprising the steps of:
   d. measuring the relative attenuation as between wave energy received at said first and second receiving locations; and
   e. computing the loss-corrected dielectric constant associated with the formations surrounding the area between the first and second receiving locations by combining the phase difference measurement with the attenuation measurement.

20. the method as defined by claim 18 further comprising the steps of:
   d. measuring the relative attenuation as between wave energy received at said first and second receiving locations; and
   e. generating a signal representative of the loss-corrected dielectric constant associated with the formations surrounding the area between the first and second receiving locations by combining the phase difference measurement with the attenuation measurement.

21. A method of determining the dielectric constant of earth formations surrounding a borehole, comprising the steps of:
   a. providing a member engageable with the borehole wall;
   b. injecting microwave electromagnetic energy into the surrounding formations from a transmitting antenna in said member;
   c. providing first and second receiving antennas in said member for receiving said microwave electromagnetic energy; and
   d. measuring the phase difference between signals received at said first and second receiving antennas, the phase difference being indicative of the dielectric constant of the formations surrounding the first and second receiving antennas.

22. A method of determining the dielectric constant of formations surrounding a borehole, comprising the steps of:
   a. deriving a quantity representative of the phase constant of microwave energy passing through the formations at a particular depth range of the borehole;
   b. deriving a quantity representative of the attenuation constant of microwave energy passing through the formations at the particular depth range of the borehole; and
   c. computing the dielectric constant at the particular depth range by combining the derived quantity representative of the phase constant with the derived quantity representative of the attenuation constant.

23. A method of determining the dielectric constant of formations surrounding a borehole, comprising the steps of:
   a. deriving a quantity $\beta^2$, where $\beta$ is the phase constant associated with microwave energy passing through the formations at a particular depth of the borehole;
   b. deriving a quantity $\alpha^2$, where $\alpha$ is the attenuation constant associated with microwave energy passing through the formations at the particular depth of the borehole; and
   c. computing the quantity $\beta^2 - \alpha^2$ which is proportional to the loss-corrected dielectric constant of the formations at the particular depth range.

* * * * *